United States Patent
McMillan et al.

(10) Patent No.: US 9,380,228 B2
(45) Date of Patent: Jun. 28, 2016

(54) HIGH DYNAMIC RANGE IMAGE SENSOR SYSTEM AND METHOD THEREOF

(71) Applicant: Gentex Corporation, Zeeland, MI (US)

(72) Inventors: Daniel G. McMillan, Zeeland, MI (US); Gregory S. Bush, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/209,235

(22) Filed: Mar. 13, 2014

(65) Prior Publication Data

US 2014/0267856 A1   Sep. 18, 2014

Related U.S. Application Data

(60) Provisional application No. 61/779,562, filed on Mar. 13, 2013.

(51) Int. Cl.
*H04N 5/76* (2006.01)
*H04N 5/353* (2011.01)
*H04N 5/3745* (2011.01)

(52) U.S. Cl.
CPC ......... *H04N 5/3535* (2013.01); *H04N 5/37452* (2013.01); *G06F 2212/00* (2013.01)

(58) Field of Classification Search
None
See application file for complete search history.

(56) References Cited

U.S. PATENT DOCUMENTS

| | | | |
|---|---|---|---|
| 5,748,303 A | 5/1998 | Davis et al. | |
| 5,892,541 A | 4/1999 | Merrill | |
| 6,175,383 B1 | 1/2001 | Yadid-Pecht et al. | |
| 6,765,619 B1 | 7/2004 | Deng et al. | |
| 6,831,689 B2 | 12/2004 | Yadid-Pecht | |
| 6,963,369 B1 | 11/2005 | Olding | |
| 6,975,355 B1 * | 12/2005 | Yang et al. | 348/308 |
| 7,202,463 B1 | 4/2007 | Cox | |
| 7,362,355 B1 | 4/2008 | Yang et al. | |
| 7,468,750 B2 | 12/2008 | Mabuchi et al. | |
| 8,144,223 B2 | 3/2012 | Van Blerkom et al. | |
| 8,954,653 B1 * | 2/2015 | Lo et al. | 711/103 |
| 2002/0027606 A1 * | 3/2002 | Yadid-Pecht | 348/298 |
| 2002/0140842 A1 * | 10/2002 | Olding | H04N 5/235 348/362 |
| 2003/0058346 A1 | 3/2003 | Bechtel et al. | |
| 2003/0081134 A1 * | 5/2003 | Luo | H04N 5/353 348/308 |
| 2004/0239790 A1 | 12/2004 | Maeda et al. | |
| 2005/0280721 A1 * | 12/2005 | van der Heide | H04N 5/3572 348/231.6 |
| 2006/0215882 A1 | 9/2006 | Ando et al. | |
| 2007/0257998 A1 | 11/2007 | Inoue | |
| 2008/0136953 A1 | 6/2008 | Barnea et al. | |
| 2008/0158400 A1 * | 7/2008 | Reyneri | H04N 5/35572 348/294 |
| 2008/0211940 A1 | 9/2008 | Hynacek | |
| 2009/0135263 A1 * | 5/2009 | Sorek et al. | 348/218.1 |
| 2010/0026838 A1 * | 2/2010 | Belenky | H04N 5/35536 348/229.1 |

FOREIGN PATENT DOCUMENTS

WO   WO9001844   2/1990
WO   WO01/09717   2/2001

OTHER PUBLICATIONS

Sung-Hyung Yang & kYoung-Rok Cho, High Dynamic Range CMOS Image Sensor with Conditional Reset, IEEE 2002 Custom Integrated Circuits Conf pp. 265-268, Cheongju Chungbuk, Korea.

* cited by examiner

*Primary Examiner* — Twyler Haskins
*Assistant Examiner* — Wesley J Chiu
(74) *Attorney, Agent, or Firm* — Price Heneveld; Scott P. Ryan

(57) ABSTRACT

A high dynamic range imager system is provided that includes an imager having a pixel array, and memory in communication with the pixel array, the memory comprising a plurality of memory cells, wherein the number of memory cells is approximately the number of whole row-times of exposures between the first conditional reset and row readout.

17 Claims, 4 Drawing Sheets

HIGH DYNAMIC RANGE IMAGE SENSOR SYSTEM AND METHOD THEREOF

CROSS-REFERENCE TO RELATED APPLICATION

This application claims priority under 35 U.S.C. §119(e) upon U.S. Provisional Patent Application No. 61/779,562, entitled "HIGH DYNAMIC RANGE IMAGER SYSTEM AND METHOD THEREOF" filed on Mar. 13, 2013, by Daniel G. McMillan et al., the entire disclosure of which is incorporated herein by reference.

FIELD OF THE INVENTION

The present invention generally relates to a high dynamic range imager system and method thereof, and more particularly, a high dynamic range imager system configured for allocating memory and method thereof.

SUMMARY OF THE INVENTION

According to one aspect of the present invention, a high dynamic range imager system includes an imager having a pixel array, and memory in communication with the pixel array, the memory comprising a plurality of memory cells, wherein the number of memory rows is approximately the number of whole row-times of exposures in the first conditional exposure.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

Figure 1:
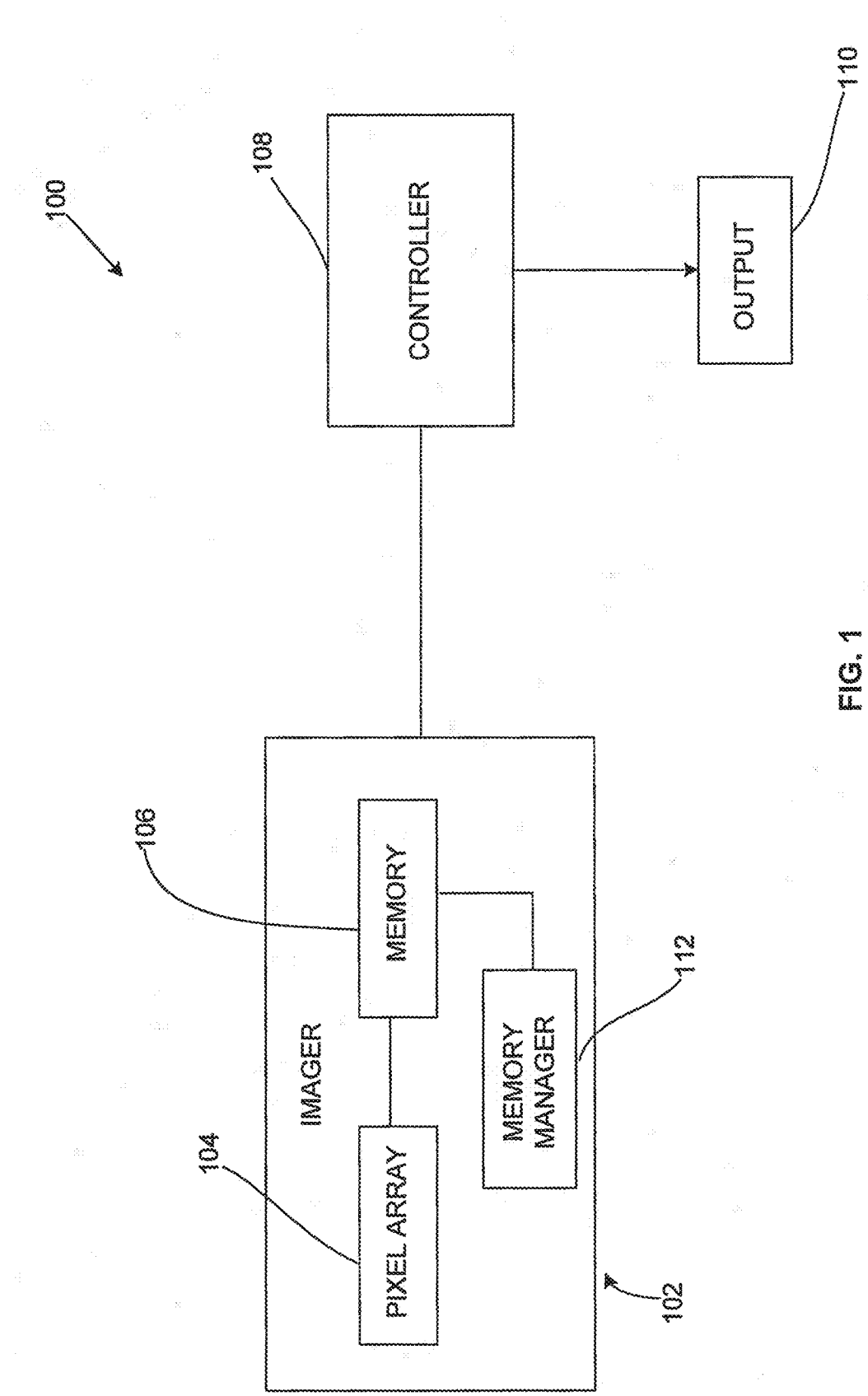
FIG. 1 is a block diagram of an imager system, in accordance with one embodiment of the present invention.

The present illustrated embodiments reside primarily in combinations of method steps and apparatus components related to an imager system and method thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In reference to FIGS. 1-4, an imager system is generally shown in FIG. 1 at reference identifier 100. The imager system 100 can include an imager generally indicated at 102, which has a pixel array 104 and memory 106. The imager system 100 can also include a controller 108 in communication with the imager 102, wherein the controller 108 is configured to emit an output 110 based upon the image received by the imager 102.

Typically, the imager 102 is a high dynamic range imager, wherein each pixel is configured to independently integrate for any one a plurality of available integration periods. The plurality of available integration periods can be simultaneous nested integration periods all ending at the same time. Each pixel can be configured to independently select the integration period, a separate controller can be configured to independently select the integration period for a pixel, or a combination thereof. In such an embodiment each pixel can be fully read out a single time per frame, as opposed to doing multiple readouts for each pixel at different integration periods in a single frame. The imager 102 reads out a row, the pixels are reset (unconditional reset), and as the pixels are integrating, the pixels can be reset if it appears the pixel is saturated or will saturate (conditional reset) and then left to integrate for the remainder of the exposure time, contingent upon further possible conditional resets. The memory 106 can be on the imager die (e.g., on chip), and can be configured to store data representative of a conditional reset or selected integration period for a pixel.

Figure 2:
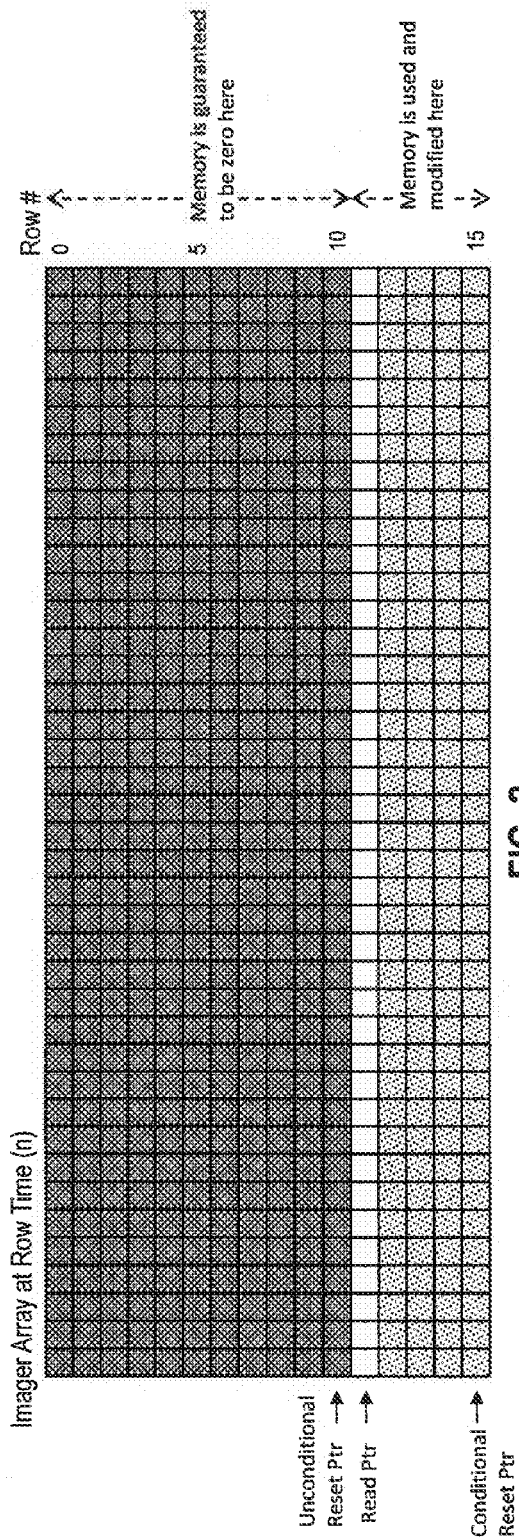
FIG. 2 is a diagram illustrating memory of an imager system.
Figure 3:
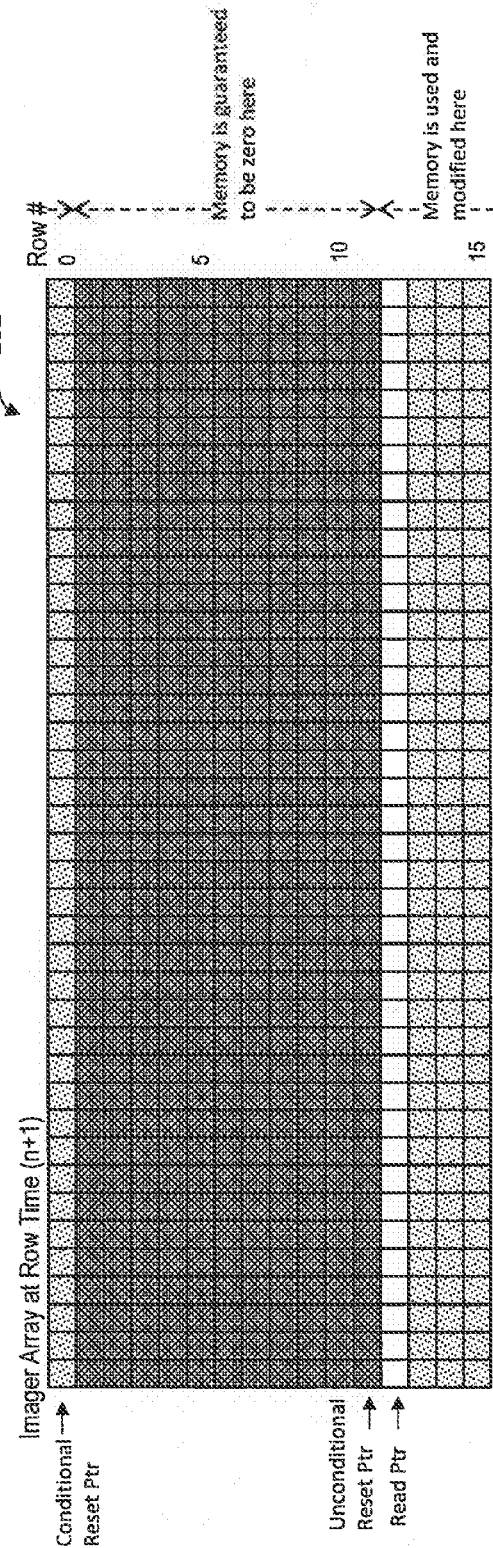
FIG. 3 is a diagram illustrating memory of an imager system.
Figure 4:
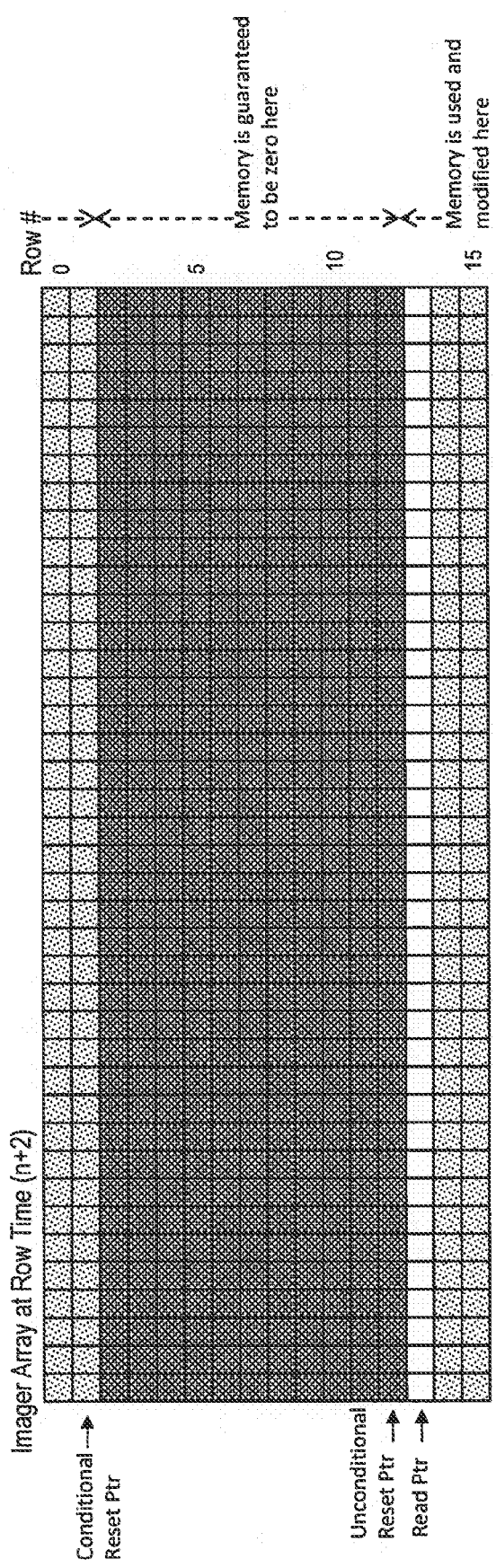
FIG. 4 is a diagram illustrating memory of an imager system.

For example, in prior art systems, on-chip memory locations correspond one-to-one with the pixel array (i.e., one three-bit memory cell (or location) for each pixel). However, much of the memory is not effectively being used, since the memory is guaranteed to be zero until the time of the first conditional reset (FIGS. 2-4). In the prior art system, the memory cell is set to zero at the unconditional reset, and then each subsequent conditional reset will read the value and potentially rewrite it if a conditional reset is called for. In the prior art system, the memory will, by definition, be zero for approximately three-quarters of the longest exposure time, and these zeros do not convey relevant information.

The imager system 100 has a reduced number of memory cells 106 as compared to the prior art system described above. Prior to the first conditional reset, there is no valuable information that justifies being stored in memory. At the point of the first conditional reset, a row of memory is allocated for the addressed row of pixels, and each pixel's memory can be either set to zero (no reset was needed) or set to one (reset was needed). Subsequent conditional resets then work in a similar manner to the prior art. Thus, the number of memory rows in the memory 106 is reduced to approximately the number of whole row-times between the first conditional reset and row readout, and a memory row may be unassociated with a specific pixel row and may be reused several times during the collection of a single frame.

According to one embodiment, the memory 106 is reduced, such that the number of memory cells is less than one-to-one with the pixel array 104. For example, an imager with a longest exposure time of about 480 row-times, and with a four-to-one ratio between exposure times would have about 120 row-times of exposure between the first conditional reset and row readout and would need approximately 120 rows of storage for all relevant information. According to another embodiment, an imager with a longest exposure time of about 1600 row-times, and with an eight-to-one ratio between exposure times would only need approximately 200 rows of storage for all relevant information.

The imager system 100 can include a memory manager 112 in communication with the memory 106. The memory manager 112 can be configured to dynamically allocate memory for a row of pixels at the time of that row's first conditional reset. In one example, the number of memory cells included in the memory 106 is approximately one quarter of the rows of pixels in the pixel array 104 plus one for the current read row. The allocated memory for a row of pixels is freed at the point of row readout, and can be used again when another row encounters its first conditional reset.

According to one embodiment, the number of memory cells in the memory 106 can be based upon an exposure time between the first conditional reset and row readout, which may or may not correspond to frame size.

Additional rows of memory cells can be included in the memory 106, so that if one of the rows is unusable (e.g., defects detected at production test or later during operation), then the memory manager 112 can monitor this list of unusable rows and skip the unusable rows when allocating memory. This can be used for, but not limited to, yield improvements during production (i.e., not having to discard devices with minor defects) and product robustness in the field (i.e., not being hindered by defective operation and requiring service).

Examples of imager 102 being a high dynamic range imager are disclosed in U.S. Pat. Nos. 8,289,430; 8,305,471; 8,378,284; 8,144,223; 8,587,706; and 9,041,838, and U.S. patent application Ser. No. 12/082,215, all of which are hereby incorporated herein by reference in their entirety. Examples of processing image data are disclosed in U.S. Pat. Nos. 8,577,169 and 8,463,035, and U.S. patent application Ser. Nos. 12/697,600 and 12/034,748, all of which are hereby incorporated herein by reference in their entirety.

Figure 5:
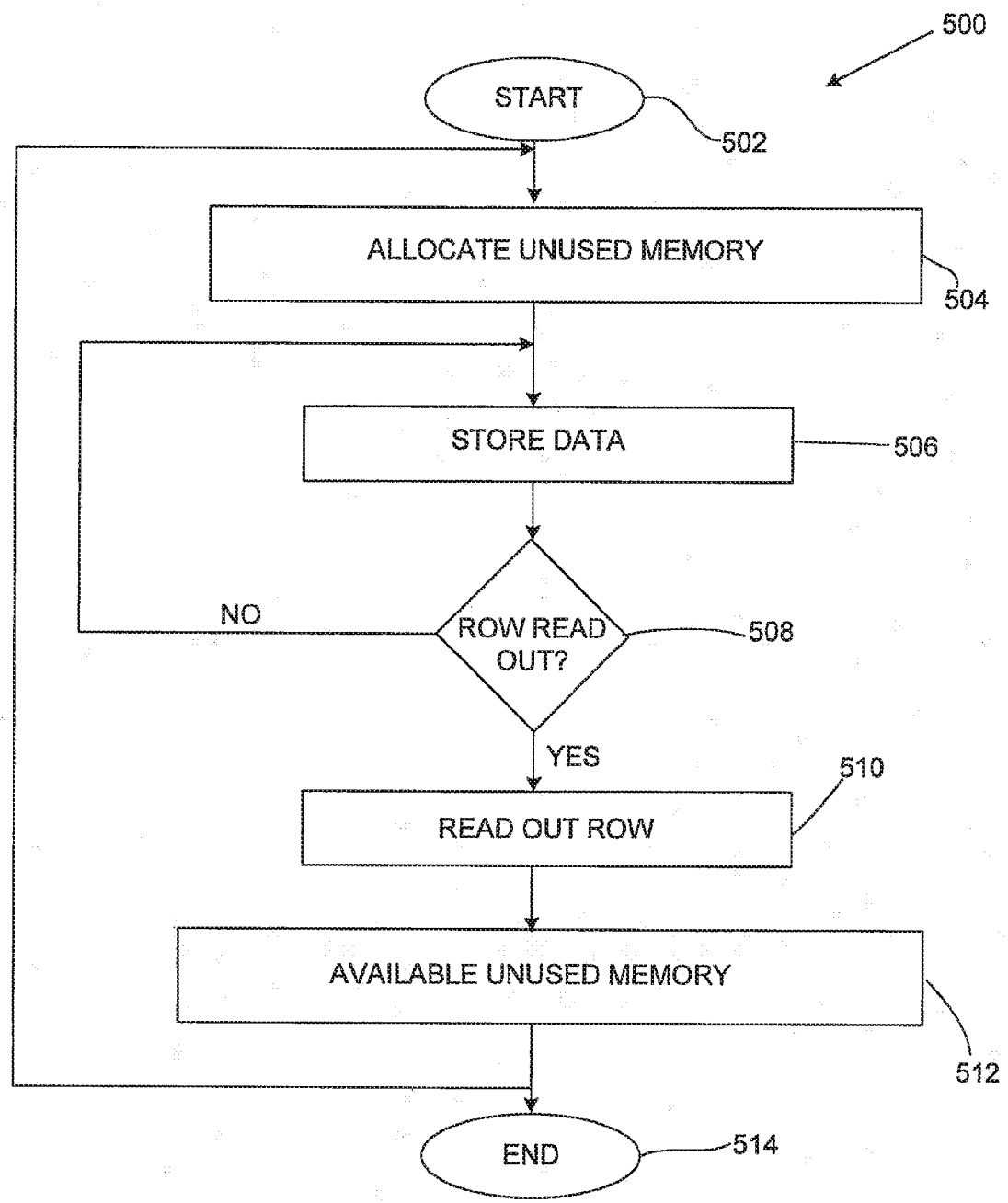
FIG. 5 is a method of allocating memory, in accordance with one embodiment of the present invention.

With respect to FIGS. 1-5, a method of allocating memory is generally shown in FIG. 5 at reference identifier 500. The method 500 starts at step 502, and proceeds to step 504, wherein unused memory is allocated. At step 506 data is stored in the memory. At decision step 508, it is determined if it is row readout time. If it is determined at decision step 508 that it is not row readout time, then the method 500 returns to step 506 and continues to store the data. However, it if is determined at decision step 508 that it is row readout time, then the row is read out at step 510. The method 500 then proceeds to step 512, wherein the memory is designated as available unused memory. The method 500 can then return to step 504 or end at step 514.

It will be appreciated that embodiments of the invention described herein may be comprised of one or more conventional processors and unique stored program instructions that control one or more processors to implement, in conjunction with certain non-processor circuits, some, most, or all of the functions of a imager system and method thereof, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be appreciated by those skilled in the art that the above described components can be combined in additional or alternative ways not explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A high dynamic range imager system comprising:
an imager comprising:
a pixel array disposed on a die comprising a plurality of pixel rows;
a memory disposed on the die and in communication with the pixel array, the memory comprising a plurality of memory cells configured to store data representative of a selected conditional reset;
a memory manager in communication with the memory and configured to allocate a portion of the memory cells to each pixel row of the plurality of pixel rows at a time of a conditional reset of each pixel row,
wherein the number of memory cells is based upon an exposure time between a first conditional reset and a row readout of each pixel row.

2. A high dynamic range imager system as in claim 1, wherein the memory manager is configured to maintain a list of defective memory locations and skip the defective memory locations when allocating the portion of the memory cells.

3. A high dynamic range imager system as in claim 2, wherein the memory manager is configured to skip the defective memory locations by allocating a plurality of additional memory cells of the memory to at least one pixel row of the plurality of pixel rows between the first conditional reset and the row readout of the at least one pixel row.

4. A high dynamic range imager system as in claim 3, wherein the additional memory cells correspond to a plurality of potentially defective memory cells.

5. A high dynamic range imager system as in claim 1, wherein the number of memory cells is a number of pixels in the plurality of pixel rows from a first conditional reset to a row readout of each pixel row.

6. An imager die for storing integration period selection data for a high dynamic range image sensor comprising:
a pixel array comprising a plurality of pixel rows;
an imager memory in communication with the pixel array, the imager memory comprising a plurality of memory cells;
a memory manager in communication with the pixel array and the imager memory, the memory manager configured to control an allocation of the memory cells for the data from the pixel array; and wherein the number of memory cells allocated by the memory manager is the number of pixels in the plurality of pixel rows from a first conditional reset of a first row of the plurality of pixel rows to a row readout of a second row of the plurality of pixel rows and the number of the memory cells is based upon an exposure time between the first conditional reset and the row readout.

7. The imager die of claim 6, wherein the number of memory cells is further based on a plurality of additional conditional resets between the first conditional reset and the row readout.

8. The imager die of claim 6, wherein the memory manager is configured to allocate a row of the plurality of memory cells to each row of the plurality of pixel rows at a time of the first conditional reset of each row of the plurality of pixels rows.

9. The imager die of claim 6, wherein the memory manager is configured to reuse a memory row of the plurality of memory cells to allocate the memory row from the second row of the pixel rows to a third row of the plurality of pixel rows in response to the row readout of the second row.

10. The imager die of claim 9, wherein the memory row is reused a plurality of times to allocate the data from a portion of the plurality of pixel rows during the collection of a single image frame.

11. A high dynamic range imager comprising:
a pixel array comprising a plurality of pixel rows;
a memory disposed on an imager die in communication with the pixel array and configured for storing data representative of an integration period index in a plurality of memory rows comprising memory cells;
a memory manager in communication with the pixel array and the memory, the memory manager configured to control a dynamic allocation of the memory cells for the data from each of the plurality of pixel rows in the plurality of memory rows; and wherein the number of pixel rows is greater than the number of the plurality of memory rows and the number of the memory cells is based upon an exposure time between a first conditional reset and a row readout of at least one pixel row.

12. The high dynamic range imager as in claim 11, wherein the memory manager is configured to dynamically allocate the memory cells to store the data from the plurality of pixel rows in response to a first conditional reset of each pixel row of the plurality of pixel rows.

13. The high dynamic range imager as in claim 12, wherein dynamically allocating the data from the plurality of pixel rows further comprises unassociating a pixel row of the plurality of pixel rows from a memory row of the plurality of memory rows in response to a row readout of the pixel row to provide an available memory row.

14. The high dynamic range imager as in claim 13, wherein dynamically allocating the data from the plurality of rows further comprises reusing the available memory row such that the plurality of memory rows is configured to store the data from each of the plurality of pixel rows.

15. The high dynamic range imager as in claim 13, wherein the number of memory rows further comprises at least one additional memory row corresponding to the memory row allocated by the memory manager for the row readout of the pixel row to provide the available memory row.

16. The high dynamic range imager as in claim 11, wherein the number of memory rows further comprises at least one additional memory row allocated by the memory manager for at least one defective memory cell identified by the memory manager in a defective memory row of the plurality of memory rows.

17. The high dynamic range imager as in claim 11, wherein the number of the memory cells is based upon the plurality of pixel rows from a first conditional reset of a first row of the plurality of pixel rows to a row readout of a second row of the plurality of pixel rows.

* * * * *